(12) United States Patent
Baeuerle

(10) Patent No.: US 8,534,320 B2
(45) Date of Patent: Sep. 17, 2013

(54) MAGNETIC TRANSMISSION

(75) Inventor: Michael Baeuerle, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 959 days.

(21) Appl. No.: 12/325,333

(22) Filed: Dec. 1, 2008

(65) Prior Publication Data

US 2009/0140183 A1    Jun. 4, 2009

(30) Foreign Application Priority Data

Dec. 3, 2007   (DE) .......................... 10 2007 058 070

(51) Int. Cl.
*F16K 11/074*   (2006.01)

(52) U.S. Cl.
USPC .... 137/625.46; 251/65; 251/208; 251/129.11

(58) Field of Classification Search
USPC ......... 251/206–209, 65, 129.11; 137/625.17, 137/625.12, 625.19, 625.46, 625.31; 123/41.08
See application file for complete search history.

(56) References Cited

U.S. PATENT DOCUMENTS

| | | | | |
|---|---|---|---|---|
| 3,424,200 A * | 1/1969 | Marley et al. | ............ | 137/625.31 |
| 3,774,878 A * | 11/1973 | Martinez | .......................... | 251/65 |
| 5,417,083 A * | 5/1995 | Eber | ............................... | 62/528 |
| 6,176,932 B1 * | 1/2001 | Watanabe et al. | ............. | 118/719 |
| 6,192,922 B1 * | 2/2001 | MacGibbon et al. | ......... | 137/486 |
| 6,634,380 B2 * | 10/2003 | Bartkus et al. | ........... | 137/625.46 |
| 6,920,845 B2 * | 7/2005 | Lelkes et al. | ............... | 123/41.01 |
| 2006/0261300 A1 * | 11/2006 | Merabet et al. | ................. | 251/65 |

FOREIGN PATENT DOCUMENTS

DE    10 2005 056 763    5/2007

* cited by examiner

*Primary Examiner* — John K Fristoe, Jr.
*Assistant Examiner* — Andrew J Rost
(74) *Attorney, Agent, or Firm* — Michael J. Striker

(57) ABSTRACT

In a magnetic transmission for coupling a valve element to a valve drive, the valve element and the valve drive are located in the same housing, the valve element includes a ring gear composed of ferromagnetic material, the ring gear and, therefore, the valve element are positioned via reluctance forces using a magnetic spindle, and the ring gear is sealed off from the spindle by a magnetically permeable housing partition.

9 Claims, 2 Drawing Sheets

MAGNETIC TRANSMISSION

CROSS-REFERENCE TO RELATED APPLICATION

The invention described and claimed hereinbelow is also described in German Patent Application DE 10 2007 058 070.5 filed on Dec. 3, 2007. This German Patent Application, whose subject matter is incorporated here by reference, provides the basis for a claim of priority of invention under 35 U.S.C. 119(a)-(d).

BACKGROUND OF THE INVENTION

Thermostatic valves are used in general to regulate coolant flow for internal combustion engines. These thermostatic valves are typically electrically heatable valves, the working point of which at the setpoint temperature may be varied using engine management as a function of the operating point of the internal combustion engine.

Control valves are currently under development which include valve elements designed as flat slide-valves, e.g., rotating disks, which are rotated using an electric drive, and which close or open or partially close and partially open—in a manner that is a function of the operating point and depends on the temperature of the internal combustion engine—corresponding flow cross-sections so that coolant may flow into a radiator or a bypass.

To minimize costs, it has proven advantageous to use a DC motor. This motor is unsuitable for use, however, as a wet-rotor motor in a water-glycol mixture which is typically present in coolants, thereby making it necessary to provide a shaft passage from an inner wet region into an outer dry region. The shaft passage is sealed off with seals, the service lives of which are usually shortened by the coolant which may potentially contain particles, e.g., moulding sand particles and the like. Elastomer-based shaft seals are therefore unsuitable. Elastomer-based shaft seals do not have the seal integrity required for the necessary service life.

Slide-ring seals may be used without a problem with media that contain particles, e.g., water-glycol mixtures which may contain particles of moulding sand, but they have the disadvantage of resulting in a significant increase in friction. A greater amount of torque is required due to the significant increase in friction at the drive shaft and, therefore, greater torque must be provided by the electric drive. This results in a significant increase in the dimensioning of the electric drive, however.

As an alternative, a concept based on a wet-running EC motor is being discussed at this time. It would definitely require electronic engine management, however. This electronic engine management makes the system considerably more expensive, however, and makes it necessary to use additional connector pins.

DE 10 2005 056 763 A1 relates to a device for controlling transmission control couplings, with which slide-valve cylinders are used. A pressure control valve for hydraulic systems, in particular automatic vehicle transmissions, is described, in the case of which a drive is provided to actuate the pressure control valve. The pressure control valve includes a valve housing into which the following empty: an inlet with inlet pressure $p_Z$, an outlet with outlet pressure $p_A$, and a control channel with a system pressure p. A slide-valve cylinder is provided in order to connect or separate the inlet and outlet and the control channel from one another. According to the solution described in DE 10 2005 056 763 A1, the slide-valve cylinder is driven by a stepper motor. The slide-valve cylinder is located in the cylinder housing, and at least one flat slide-valve cylinder segment is formed on this at least one slide-valve cylinder.

Magnetic couplings may be used in addition to the systems described above, which are driven via electric motors, either by a DC motor or a wet-running EC motor.

SUMMARY OF THE INVENTION

Accordingly, it is an object of the present invention to provide a magnetic transmission, which avoids the disadvantages of the prior art.

According to the present invention, a magnetic transmission is used to couple a flat slide-valve designed as a rotating disk with a transmission. The magnetic transmission essentially includes a ring gear which encloses the control disk and is preferably composed of ferromagnetic material, and a spindle composed of ferromagnetic material. The ring gear, which is preferably composed of ferromagnetic material, is separated from the spindle composed of ferromagnetic material by a plastic wall which is preferably manufactured as an injection-moulded component, thereby enabling the ring gear, which is preferably composed of ferromagnetic material, and the spindle, which is composed of ferromagnetic material, to act on one another in a contactless manner. Via the solution of a magnetic transmission provided according to the present invention, it is possible to eliminate a shaft passage for the output shaft of the electric drive into a wet part of the delivery assembly; due to the selected worm gear solution, it is possible to realize a large gear ratio of approximately 27.

The housing of the delivery assembly with a magnetic transmission proposed according to the present invention is preferably made of a plastic material using the injection-moulding process, thereby providing a great deal of freedom in terms of designing wall thicknesses and external geometries. Moreover, highly diverse installation conditions of the delivery assembly on different types of internal combustion engines and cooling systems having different dimensions may be accommodated.

In the solution provided according to the present invention, a ferromagnetic ring gear is preferably installed on the rotating disk which includes one or more control cross-sections and is designed as a flat slide-valve. The ring gear includes helical toothing on its outer circumference. The helical toothing is coupled via reluctance forces with the spindle which is composed of a permanent-magnetic material and is spacially separated from the ferromagnetic ring gear via the partition made of plastic material. The magnetic transmission that is obtained and is designed as a worm gear in particular runs in a manner that is completely contactless and, therefore, wear-free, and it is permanently sealed off by a partition in the housing, the partition being composed of plastic material and having relatively thin walls. This design ensures, in particular, that additional friction will not be produced, thereby ensuring that the drive motor, which is preferably a DC motor for reasons of cost, need not be designed with greater dimensions, since additional torque output is not required.

In contrast to mechanical worm gears, in the case of which the worm meshes with the worm wheel, in the solution provided according to the present invention, the tooth does not run in a corresponding tooth gap, due to the mechanical separation of the spindle and the worm wheel. Instead, a tooth of the ring gear which is preferably composed of ferromagnetic material runs on a tooth of the spindle which is preferably composed of a permanent-magnetic material and is driven by a DC motor. Due to these circumstances, the tooth geometry of the ring gear, which is preferably composed of ferromagnetic material, and the spindle, which is composed of ferromagnetic material, may be designed with a greatly simplified rectangular cross section.

By avoiding the use of a shaft seal between a wet region and a dry region, it is possible to prevent the sealing problem and to forego the use of expensive slide-ring seals which are highly resistant to particles for the duration of their application, but which unfavorably influence the torque demand due to the friction produced. It would therefore be necessary to increase the dimensions of the electric drive. Due to the solution of a magnetic transmission provided according to the present invention, it is possible to prevent the use of a wet-running EC motor, which would definitely require that electronic motor control be used and which includes a higher number of contact pins, and to use a less expensive DC motor instead.

DESCRIPTION OF THE PREFERRED EMBODIMENTS

Figure 1:
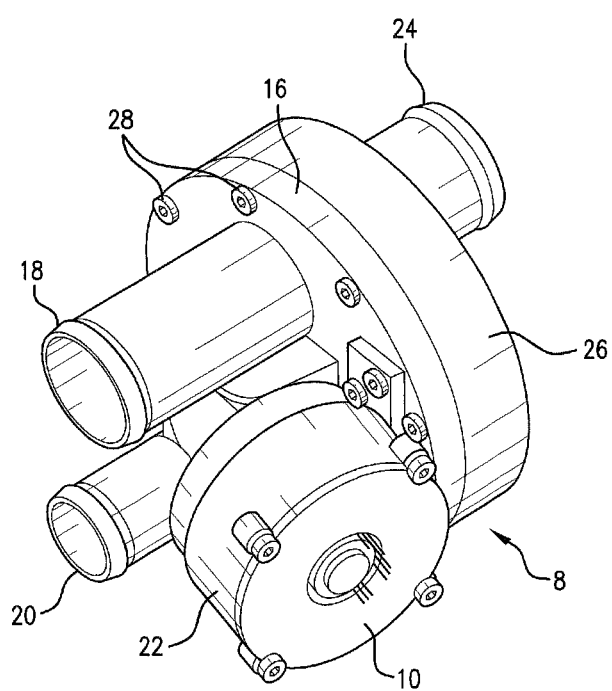
FIG. 1 shows a perspective top view of a delivery device for cooling medium.

As shown in FIG. 1, a valve is designed as a flat slide-valve. The perspective illustration presented in FIG. 1 shows a top view of the housing of the valve which is designed as a flat slide-valve.

As shown in FIG. 1, valve 8 includes a first housing part 16 and a second housing part 26 connected thereto via fastening screws 28. A housing of a drive 10 is flange-connected to first housing part 16. First housing part 16 includes an outlet—which has a greater flow cross-section for cooling medium—to a radiator (not depicted), and an outlet 20—which is also integrally moulded with first housing part 16—to a bypass for cooling medium. The cooling medium used with the internal combustion engines of today is a mixture of water and glycol, which may contain particles, e.g., moulding sand particles. As shown in FIG. 1, second housing part 26, which is joined to first housing part 16 via a number of fastening screws 28, includes an inlet connector 24 via which warmed cooling medium flows out of the internal combustion engine—on the inlet side, relative to valve 8—and into valve 8.

As shown in the illustration in FIG. 1, outlet 18 of valve 8 which empties into the radiator has a cross-section that is larger than that of outlet 20 which leads into the bypass.

First housing part 16 and second housing part 26 are manufactured in general as injection-moulded parts using a plastic material.

Depending on the rotation of valve element 14 which is designed as a flat slide-valve, first cross-sectional geometry 36 and second cross-sectional geometry 38 overlap the outlet cross-sections of outlet 18 to the radiator and outlet 20 to the bypass to a more or less greater extent. As a result, the volumetric flow of the cooling medium—which, with the internal combustion engines used today, is typically a water/glycol mixture—is divided between the radiator and a bypass. The partitioning and opening of the outlet cross sections of outlet 18 and outlet 20 take place as a function of the operating point, i.e., as a function of the operating point of the internal combustion engine. Drive 10 shown in FIG. 1 is connected to the engine management device, in which the setpoint temperature and other parameters are stored. The setpoint temperature is used to determine the working point of a thermostatic valve, as shown in FIG. 1.

Figure 2:
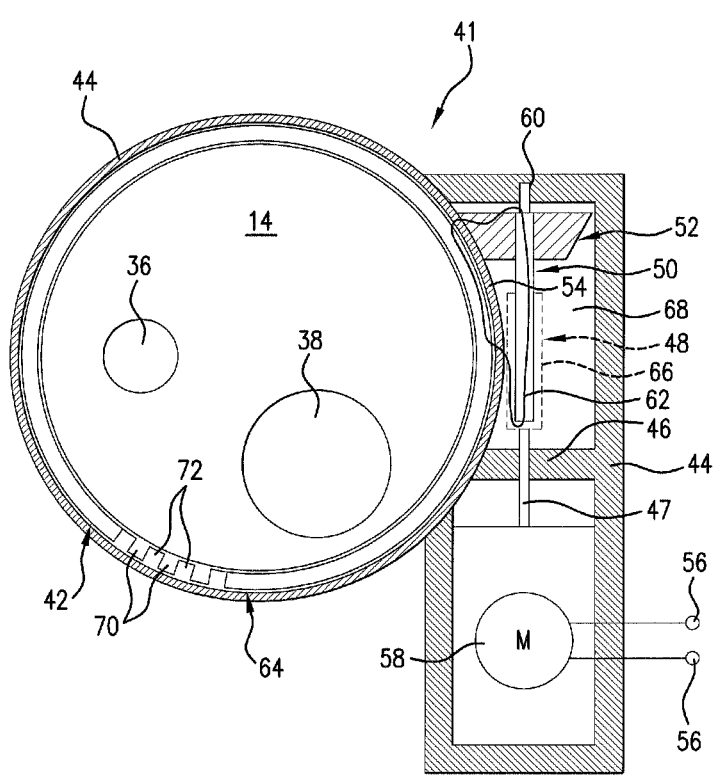
FIG. 2 shows a sectional view through the delivery device which is proposed according to the present invention, with a magnetic transmission.

FIG. 2 shows a first embodiment of the valve provided according to the present invention, in the case of which valve element 14 is designed as a control disk and is coupled to a electric drive in a contactless manner via a magnetic transmission.

FIG. 2 is a sectional view through the magnetic transmission provided according to the present invention, and which is located in a housing 44. Housing 44 is preferably manufactured as a single-pieced housing the plastic injection-moulding process. Housing 44 of valve 8, which is used, e.g., to regulate coolant flow for internal combustion engines, includes a chamber in which valve element 14 designed as a control disk or flat slide-valve is located. Valve element 14 includes, e.g., first control cross-section 36 and second control cross-section 38, the diameters of which correspond to the flow cross-section of outlet 18 for a medium, e.g., a cooling fluid, to the radiator, and to the flow cross-section of outlet 20 to a bypass line for the cooling medium.

Valve element 14 which is designed as a flat slide-valve or control disk 14 is enclosed by a ring gear 42. Ring gear 42 is preferably composed of a ferromagnetic material. Ring gear 42 may be installed, e.g., on the circumference of valve element 14 using a press fit or shrink fit. As an alternative, it is also possible to attach a plastic ring—via injection moulding—which is composed of a plastic that contains ferromagnetic particles to circumference 40 of valve element 14 designed as a control disk or a flat slide-valve. In this case, ferromagnetic properties are imparted to the plastic via the ferromagnetic particles contained therein.

Ring gear 42, which is preferably composed of a ferromagnetic material, includes outer toothing 64, which may be designed, e.g., as helical toothing or rectangular toothing 72. Rectangular toothing may be created on the outer circumference of ring gear 42 composed of a ferromagnetic material using a simple fabrication method. The rectangular toothing includes individual rectangular teeth 70 which are separated from one another by rectangular spaces as viewed in the circumferential direction of ring gear. As shown in the illustration in FIG. 4, outer toothing 64 of ring gear 42, which is preferably composed of ferromagnetic material, is separated from cavity 66 via a magnetically permeable housing partition 54 which is an integral component of housing 44 made of plastic using an injection-moulding process. Cavity 68 of housing 44 is limited by the outer housing wall and a partition 46.

A drive which is designed as a DC motor 58 in particular, for reasons of cost, is located in a further chamber of housing 44 of valve 8. The one output shaft of DC motor 58 passes through—see reference numeral 47—partition 46 which separates DC motor 58 from cavity 68 in housing 44. Output shaft 47 of DC motor 58 is supported in partition 46 of housing 44, and in an outer wall—which limits cavity 68—of housing 44; see position 60 in FIG. 2.

Shaft 47 which is supported in partition 46 extends into cavity 68 of housing 44. Shaft 47 is connected to a bar magnet 50 which is composed of a permanent-magnetic material, and onto which spindle 48 may be shrunk-fit, for example. Spindle 48 is preferably composed of a ferromagnetic material and may also be non-rotatably fastened to bar magnet 50 using another connection, e.g., a feather key connection, a wedge connection, or a profile which is suited for transmitting a torque.

Bar magnet 50, on the outer circumference of which spindle 48—which is driven by output shaft 47 of DC motor 58—is non-rotatably situated, extends through cavity 68 in the direction of bearing 60. A field transmitter 52 is located on the outer circumference of bar magnet 50, between driven spindle 48 and bearing 60. Field transmitter 52 is used to transfer field lines 62 as indicated via the path of the field lines drawn in FIG. 2. Field lines 62 extend across field transmitter 52 through magnetically permeable housing partition 54 to outer toothing 64 of ring gear 42, which is preferably composed of ferromagnetic material.

Field lines 62 extend in the circumferential direction of ring gear 42 to the point at which a tooth 70 of outer toothing 64 of ring gear 42 is opposite to a tooth of outer toothing 64 of driven spindle 48. Field lines 62 extend through driven spindle 48 back into bar magnet 50 and, from there, back to field transmitter 52, thereby forming a magnetic circuit. In this manner, a coupling is created between driven spindle 48, which is composed of ferromagnetic material, in cavity 68 and ring gear 42, which encloses valve element 14 which is preferably designed in the shape of a disk and which is also composed of ferromagnetic material. Ring gear 42 and driven coil 48 are permanently sealed off from one another via housing partition 54 of housing 44 of valve 8 without the use of a shaft passage and without the associated sealing problems.

As also shown in the illustration in FIG. 2, DC motor 58 is contacted to contacts 56 which extend laterally out of the chamber of housing 44 of valve 8, in which the DC motor is located. Output shaft 47 of DC motor 58 may be supported in partition 46 using a bushing, a sliding bearing or a roller bearing, and the same applies for the design of bearing 60 of bar magnet 50 on the front wall which limits cavity 68 of housing 44.

Since housing 44 is manufactured using the plastic injection-moulding process, the wall thickness of magnetically permeable housing partition 54 between outer toothing 64 of ring gear 42 and cavity 68 of housing 44 may be designed with a minimal wall thickness. Only those parameters that are relevant to manufacturing are of decisive significance in terms of the minimal wall thickness of magnetically permeable housing partition 54, since magnetically permeable housing partition 54 performs only the sealing function, but no other function, in particular a supporting function, in the installed state of housing 44 and, therefore, valve 8.

In accordance with the selected diameter ratio of outer toothing 64 on ring gear 42 relative to the diameter of outer toothing 66 of driven spindle 48, gear ratios between 10:1 and 30:1 and more occur at magnetic transmission 41 between driven spindle 48 and valve element 14. This depends on the sizing of the diameter of valve element 14 designed as a flat slide-valve or a control disk, and the outer diameter of outer toothing 64 and 66.

Magnetic contact and, therefore, wear and play are prevented from taking place between ring gear 42 and driven spindle 48 via magnetic transmission 41 which is proposed according to the present invention and includes components which interact mechanically with one another in a contactless manner, the components preferably including ring gear 42, which is preferably composed of ferromagnetic material, and driven spindle 48. Via the solution which is provided according to the current invention, in the form of the coupling of ring gear 42 and driven spindle 48 via reluctance forces, the need for a shaft seal between a dry part and a wet part is eliminated, in particular at a valve 8 which is exposed to an aggressive medium. Given the design of shaft seals, leakage always sets in during the service life, which may have serious consequences if the leak is not detected in time.

By implementing—in a manner described according to the present invention—magnetic transmission 41 which operates in a contactless manner, an additional increase in friction—which would result from the seals, such as elastomer sealing rings or slide-ring seals, being rubbed against is prevented, which would otherwise require that DC motor 58 provide greater torque output. Since the sealing problems do not occur with the solution provided according to the present invention, the sizing of DC motor 58 may be based solely on the torque required to displace disk-shaped valve element 14.

It will be understood that each of the elements described above, or two or more together, may also find a useful application in other types of constructions differing from the types described above.

While the invention has been illustrated and described as embodied in a magnetic transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A magnetic transmission for coupling a valve element to a valve drive located in a same housing, the magnetic transmission including a ring gear assignable to the valve element and composed of ferromagnetic material; and a driven spindle separated from said ring gear via a housing partition, said ring gear forming a magnetic circuit with said driven spindle, wherein said ring gear and said driven spindle are coupled via reluctance forces, and magnetic field lines extend through a field transmitter and through teeth, wherein said teeth are positioned opposite to one another along a housing wall of said ring gear and said driven spindle, the magnetic transmission being designed as a worm gear, wherein said driven spindle is composed of a ferromagnetic material, is non-rotatably situated on a single bar magnet, and includes an external toothing.

2. A magnetic transmission as defined in claim 1, wherein the valve element is configured as an element selected from the group consisting of a control disk and a flat slide-valve and provided with at least one control cross-section.

3. A magnetic transmission as defined in claim 1, wherein the valve element is configured as an element selected from the group consisting of a control disk and a flat slide-valve and provided with at least two control cross-sections.

4. A magnetic transmission as defined in claim 3, further comprising means forming a first outlet for a medium and a second outlet for the medium, said control cross-sections being formed as cross-sections selected from the group consisting of partially closed flow cross-sections, completely closed flow cross-sections, and completely open flow cross-sections of the first outlet and the second outlet.

5. A magnetic transmission as defined in claim 1, wherein said ring gear is arranged so that it is located on a circumference of the valve element and includes an external toothing.

6. A magnetic transmission as defined in claim 1, wherein said external toothing is configured as a toothing selected from the group consisting of a helical toothing and a rectangular toothing.

7. A magnetic transmission as defined in claim 1, wherein said housing includes said housing partition which is magnetically permeable and separates said ring gear from said driven spindle, which is supported in a cavity in said housing.

8. A magnetic transmission as defined in claim 7, wherein said drive has an output shaft supported in a partition and a wall that bounds said cavity.

9. A valve element provided in a thermostatic valve for regulating a cooling flow of an internal combustion engine, and configured as the magnetic transmission as defined in claim 1.

\* \* \* \* \*